United States Patent [19]
Kinoshita

[11] Patent Number: 4,942,483
[45] Date of Patent: Jul. 17, 1990

[54] MULTI-CHIP TYPE CONTACT IMAGE SENSOR

[75] Inventor: Yukio Kinoshita, Kanagawa, Japan
[73] Assignee: Sony Corporation, Tokyo, Japan
[21] Appl. No.: 287,141
[22] Filed: Dec. 21, 1988
[30] Foreign Application Priority Data
  Jan. 14, 1987 [JP] Japan ................................ 63-4943
[51] Int. Cl.$^5$ ............................................ H04H 1/04
[52] U.S. Cl. .................................... 358/484; 358/471
[58] Field of Search ............... 358/484, 483, 482, 471
[56] References Cited

U.S. PATENT DOCUMENTS
4,742,240 5/1988 Yamamishi et al. ................ 358/483

FOREIGN PATENT DOCUMENTS
163942 12/1980 Japan ................................. 358/484
210769 12/1982 Japan ................................. 358/484
256266 12/1985 Japan ................................. 358/484

Primary Examiner—Edward L. Coles, Sr.
Attorney, Agent, or Firm—Lewis H. Eslinger; Jay H. Maioli; Donald S. Dowden

[57] ABSTRACT

A contact image sensor has a plurality of line sensors. Each of these line sensors is mounted adjacent to an optical block having the function of refracting or reflecting the light incident on a first surface and causing the light to exit at another surface along one of a plurality of light paths divided from the incident light path. A plurality of line sensors are provided on the other ends without being arrayed on one and the same straight line. This enables in-line data to be read out accurately, while enabling the contact image sensor to be assembled more easily than in the case of the prior-art technique.

4 Claims, 2 Drawing Sheets

MULTI-CHIP TYPE CONTACT IMAGE SENSOR

BACKGROUND OF THE INVENTION

1. Field of the Invention

This invention relates to a contact image sensor constructed using a plurality of line sensors and, more particularly, to a contact image sensor employed as an original document read-out device employed in turn for example in a copy machine or a facsimile machine.

2. Description of the Prior Art

In the contact image sensor in which sensors are provided in association with an original document, there is a limit to the size along the longitudinal direction of the line sensor. Therefore there is thus known a so-called multi-chip system in which a plurality of line sensors are combined together in order to allow to read out an original document of a larger width.

As the contact image sensor making use of these line sensors, there is known a so-called in-line system in which the line sensors are arranged along a straight line, or a so-called staggered system in which the line sensors are arranged in an interleaved relation with respect to one another. The technique concerning the contact image sensor having these modified line sensor arrangements is described in the Japanese Patent Application Laid Open No. 61-126861.

In the aforementioned prior-art image sensor having two rows of interleaved line sensors, a line memory, for example, need be provided since data readout cannot be performed serially. On the other hand, it is difficult to reduce or enlarge the data size. In the prior-art image sensor having a linear array of the line sensors, problems are presented in connection with the line sensor pitch at the junction points of the adjoining line sensors. It is also difficult to maintain a high degree of bonding accuracy. In the technique of the above prior-art publication, the ends of the line sensors need be processed in a specific manner, while there is similarly presented a problem in connection with the bonding accuracy.

OBJECTS AND SUMMARY OF THE INVENTION

According to one aspect of the present invention, the contact image sensor has an optical block adapted to refract or reflect the incident rays on its one end and to cause the light to exit at its other end along light ray paths extending in plural directions, and a plurality of line sensors mounted to its other end.

The optical block is formed by path dividing or splitting means, such as prisms, half mirrors, mirrors, either alone or in combination. This optical block is arranged to have a rays incident side and a rays emergent side. The optical path at one side or rays incident side of the optical block is linear for reading out the original document, and that at the other side or rays emergent side of the block is not linear since the light rays path is divided or deviated there at into plural light ray paths. The light ray paths may be divided into different directions at intervals of a given unit length. It suffices that the light ray paths differ from a given unit length to an adjacent unit length. Also the light ray paths may be divided at an angle or at a number of points that are proper in connection with the specific arrangement of the line sensors. For example, the light ray paths may be divided into two directions orthogonal to the rays incident direction. The other ends of the block may be contoured in accordance with, for example, the size of the line sensors. Light transmitting means may be provided at one side of the optical block. As such light transmitting means, a focusing rod lens array or cylindrical lenses, for example, may be employed. Polarizer plates or light polarizing means may also be provided if needed. The line sensors are attached to the other ends of the optical block. A light rays source may be provided at a predetermined location in the contact image sensor.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENT

Figure 1:
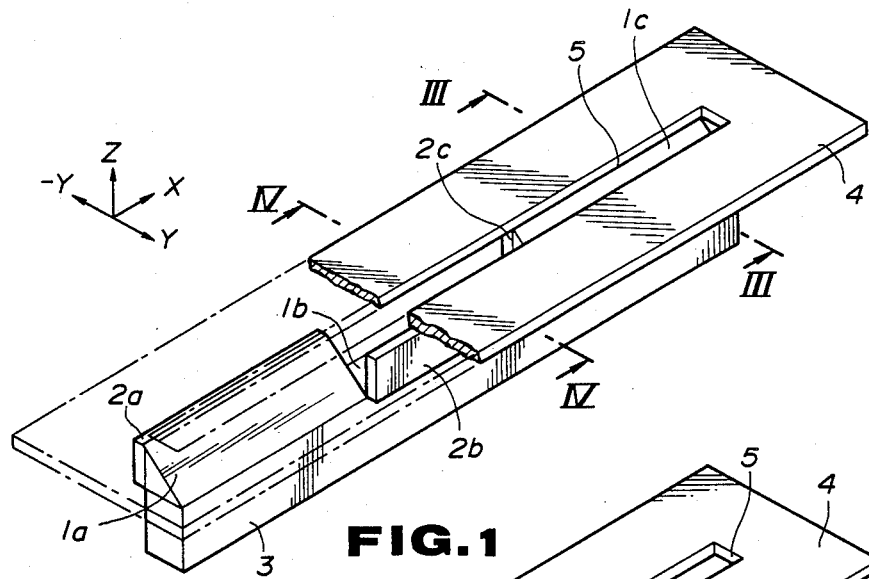
FIG. 1 is a perspective view showing a contact image sensor constructed in accordance with the present invention, with portions thereof being cut away.

By referring to the drawing, a preferred embodiment of the present invention will be explained hereinbelow in detail.

Figure 2:
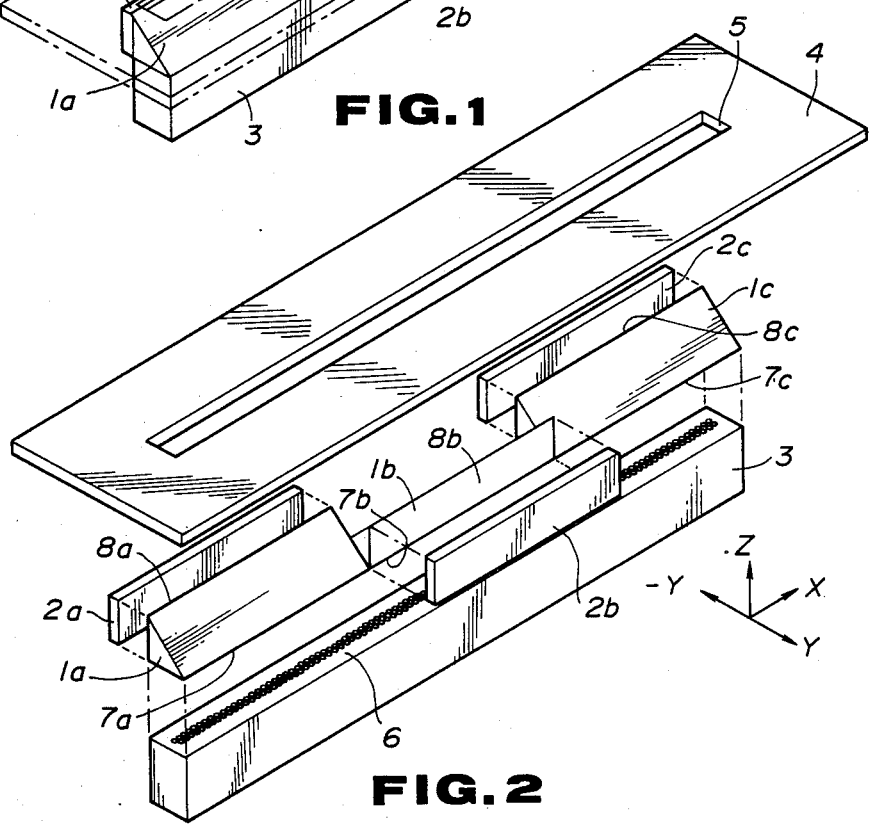
FIG. 2 is an exploded perspective view of the contact image sensor of FIG. 1.

As shown in FIGS. 1 and 2, a contact image sensor shown therein has an optical block formed by three prisms.

The contact image sensor basically includes a focusing rod lens array 3 in the form of a regular parallelepiped, three prisms 1a, 1b and 1c forming an optical block adapted for separately deviating or dividing the incident light ray path into separate light rays paths, line sensors 2a, 2b and 2c associated with said prisms, and a base plate or substrate 4.

The focusing rod lens array 3 is provided so that its optical axis extends vertically with respect to the original document surface, or along the direction Z in the drawing, and is in the form of an elongated regular parallelepiped extending along the direction X in the drawing and having a length related to the original document width. The rod lenses of the lens array are terminated on the bottom and the upper surfaces of the lens array. The original document to be read out is placed on the bottom surface of the lens array, while the prisms 1a, 1b and 1c are mounted on the upper surface 6 of the lens array.

Each of the prisms 1a, 1b and 1c has the function of deviating the proceeding direction of the incident light rays which is the light rays traveling from the original document. Each of the prisms 1a, 1b and 1c is in the form of a triangular prism having the cross-sectional shape of a right angled isosceles triangle. One of the two sides of each prism 1a, 1b or 1c together defining the right angle of the cross-section is formed as an end face 7a, 7b or 7c which is the light incident side and the other side is formed as the other end face 8a, 8b or 8c which is the light emergent side. The longitudinal direction of each prism 1a to 1c approximately in the form of the triangular prism coincides with the original document scanning direction, that is, the direction X in the drawing along which extends the focusing rod lens array 3. The prism 1a has its one end face 7a resting on the upper surface 6 of the focusing rod lens array and its other end face 8a lying in the -Y direction in the drawing. The prism 1b is provided adjacent to the prism 1a at the end in the X direction of the prism 1a and has its one end face 7b lying on the upper surface 6 of the focusing rod lens array 3 and its other end face 8b lying in the Y direction in the drawing. Similarly, the prism 1c is provided adjacent to the prism 1b at the end in the X direction of the prism 1b and has its one end face 7c lying on the upper surface 6 of the focusing rod lens array 3 and its other end face 8c lying in the -Y direction in the drawing. In this manner, the end faces 8a to 8c of the prisms 1a to 1c are in spaced-apart relation and oriented in such a manner that the end faces 8a and 8c will lie along the -Y direction and the end face 8b will lie along the Y direction so that only the end face 8b of the central prism 1b has the orientation different from that of the other end faces 8a and 8c.

The line sensors 2a, 2b and 2c are adapted to convert optical data of the original document obtained via the focusing rod lens array 3 and the prisms 1a to 1c into corresponding electrical signals. There line sensors 2a to 2c are provided on the other end faces 8a to 8c of the prisms 1a to 1c, respectively. More in detail, the line sensor 2a is provided on the other end face 8a of the prism 1a to receive the light rays proceeding along the -Y direction, while the line sensor 2b is provided on the other end face 8b of the prism 1b to receive the light rays proceeding along the Y direction, and the line sensor 2c is provided on the other end face 8c of the prism 1c to receive the light rays proceeding along the -Y direction. Each of the line sensors 2a to 2c is provided with a light receiving section, not shown, extending along a straight path along the X direction.

The substrate 4 is provided on top of the prism 1a to 1c and the line sensors 2a to 2c and used for providing connection with the main body of the device. Approximately at the center of the substrate 4, there is formed an elongated window 5 extending along the X direction. The window 5 is opened for example for transmitting the light therethrough and a linear light source or an array of dotted light sources are provided on top of the window for directing the light for reading out the original document through the window 5 towards the original document.

With the above described contact image sensor of the present invention, data lying along a straight line may be read by virtue of the function of the prisms 1a to 1c making up the optical block. For example, the light from the light source is radiated onto the original document surface G to be readout via the window 5, prisms 1a to 1c and the focusing rod lens array 3. The radiated light is reflected on the original document surface G in accordance with the contour of the characters or figures thereon. The reflected light again is incident on the focusing rod lens array 3 to be then incident via the end faces 7a to 7c of the prisms 1a to 1c on the prisms 1a to 1c making up the optical block.

Figure 3:
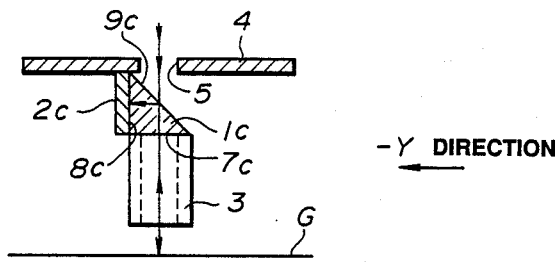
FIG. 3 is a sectional view taken along line III—III of FIG. 1.
Figure 4:
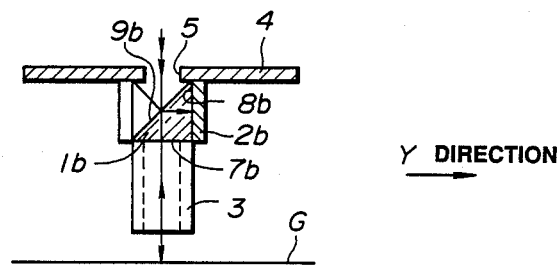
FIG. 4 is a sectional view taken along line IV—IV of FIG. 1.

The light thus incident on the prisms 1a to 1c is routed along a path via the prism 1c or 1a different from one via the prism 1b, as shown in FIGS. 3 and 4. Thus, as shown in FIG. 3, the light incident on the one end face 7c of the prism 1c is reflected at an inclined surface 9c of the prism 1c and directed therefrom towards the other end face 8c of the prism 1c along the -Y direction. The light exiting the prism 1c is received at the line sensor 2c provided on the other end face 8c of the prism 1c. On the other hand, the light incident on the end face 7b as shown in FIG. 4 is reflected at the inclined surface 9b of the prism 1b and directed therefrom towards the other end face 8b of the prism 1b in the Y direction which is opposite to the light path for the prism 1c. The light exiting from the prism 1b is received by the line sensor 2b providing on the other end face 8b of the prism 1b.

From the foregoing it is seen that the present invention provides a contact line sensor in which the light exit direction from a given prism differs from that from the adjacent prism. Hence, when reading out original document data extending along a straight line, there is no necessity of providing line sensors along a straight line corresponding to the straight line of the data, so that the problem of maintaining precision in bonding the line sensors together may be resolved satisfactorily. In other words, the problem of seams or joints between the line sensors may be resolved and the original document data to be read out are arrayed on a straight line. For this reason, there is no necessity of providing a memory as in the case in which the prisms are in a staggered array thus providing a convenience in size enlargement or size reduction.

It should be noted that the number of the prisms making up the optical block of the contact image sensor need not be three as in the present embodiment, but may be any natural number other than unity depending on the size of the line sensors or that of the original document to be read out. As for the optical block, it is only sufficient if the light path in the block is adapted to be deviated at intervals of a unit length, so that it may be constructed by, for example, half mirrors. As for the position of the light source, a linear light source or an array of dot-like light sources may also be provided on the lateral side of the optical block, in lieu of providing the light source or the array of light sources for irradiating the original document via the window 5.

I claim:

1. A contact image sensor for reading out data from an original document along a straight line, said sensor comprising:
    an optical block having a first surface upon which light is incident from the original document and a plurality of exit surfaces through which the light emerges from the block, said exit surfaces being in spaced-apart relation to each other and the block being constructed with light path dividing means for deviating different rays of the light in respectively different directions so that said different rays are respectively directed to different ones of said exit surfaces, and
    a plurality of line sensors separately associated with said exit surfaces.

2. The contact image sensor according to claim 1 wherein said light path dividing means divides the light path at intervals of a unit length, further comprising straight-shaped light transmitting means mounted adjacent to said first surface for transmitting light from said original document to said optical block.

3. The contact image sensor according to claim 2 wherein said light path dividing means comprises a plurality of prisms conforming in size to said line sensors.

4. A contact image sensor for reading out data along a straight line from an original document, said sensor comprising:

a straight-shaped focusing rod lens array having a length related to the original document read-out width, said array having an optical axis extending normal to an original document surface, a light-entrance side opposable to the original document and a light-exit side opposite the light-entrance side, a plurality of prisms each in the form of a triangular prisms having a unit length along the original document scanning direction and having a cross section along a direction normal to said scanning direction in the form of a right-angled triangle, said prisms being mounted with a first surface thereof defining the right angle facing the light-exit side of said focusing rod lens array, and with the other surfaces of different ones of said prism facing in different directions from a given one of said prisms to the adjacent prism or prisms, a plurality of line sensors mounted adjacent to said surfaces and having light-receiving surfaces lying parallel to said original document scanning direction, and a substrate having a straight-shaped slit for a read-out light source, said slit being in register with the optical axis of said focusing rod lens array.

* * * * *